(No Model.)
E. WESTON.
ELECTRO-MAGNETIC MOTOR.
No. 316,091.  Patented Apr. 21, 1885.
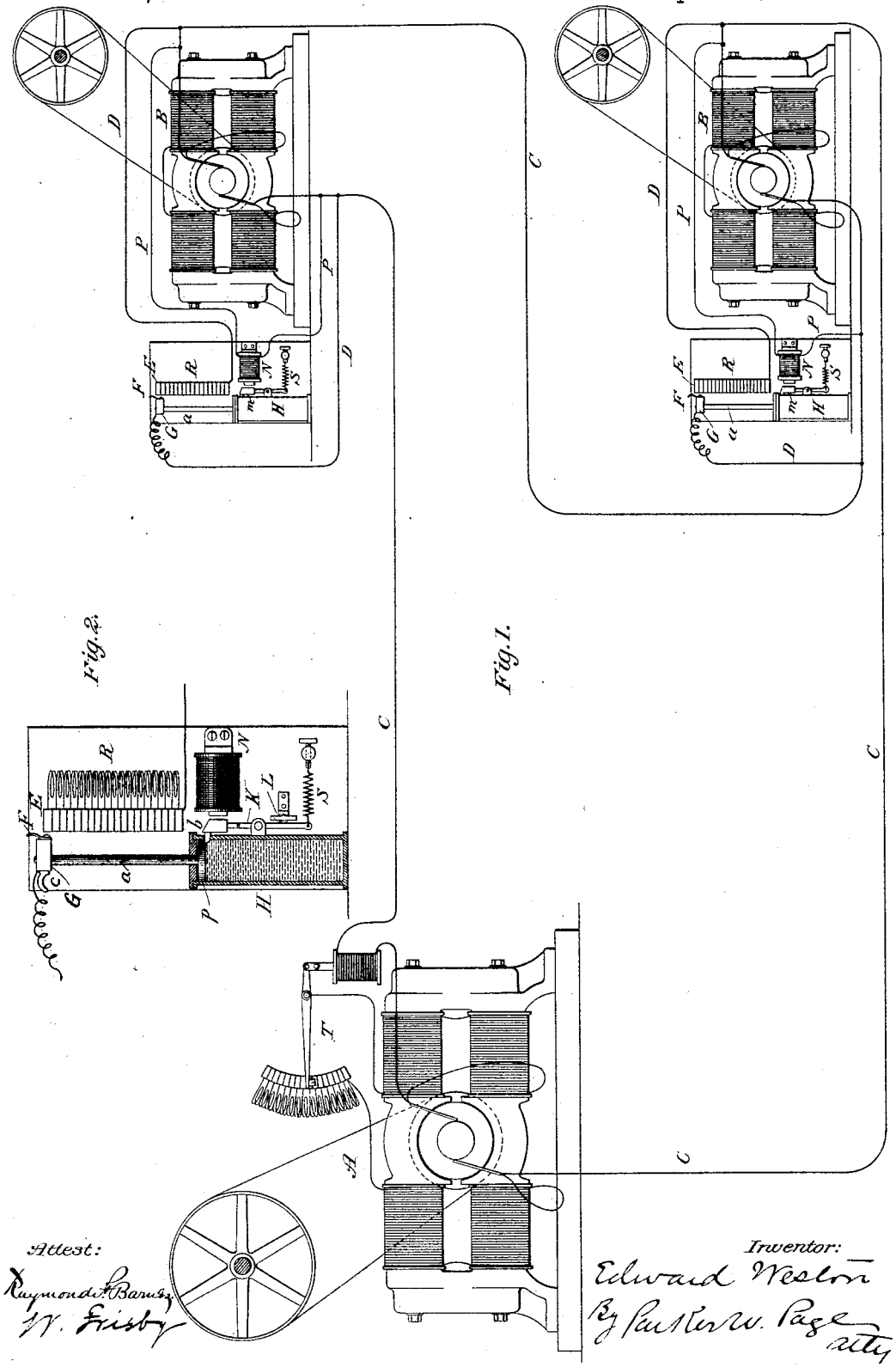

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRO-MAGNETIC MOTOR.

SPECIFICATION forming part of Letters Patent No. 316,091, dated April 21, 1885.

Application filed May 17, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electro-Magnetic Motors, of which the following is a specification, reference being had to the drawings accompanying and forming a part of the same.

My invention relates to systems for the conversion of electrical energy into power, in which electro-magnetic motors are connected in series with a circuit from an electrical generator.

My invention consists, first, in the combination, with each motor in a system of this kind, of a device for gradually shunting the same from the circuit; secondly, in the combination with each device of means that operate or are brought into operation to automatically bring into action the shunting device when the motor offers too great an opposition to the passage of the current; and, lastly, in certain novel features of construction, the nature and purpose of which will be hereinafter described. In a system of this character each motor develops an electro-motive force opposed to that of the generator supplying the current, and, as is well known, this force varies as the speed of a motor and inversely as the load upon it. If all the motors be working under uniform loads, no variation in the current strength occurs; but in practice this condition seldom exists, as the work done by the motors is being constantly varied. Variations within certain limits may be easily compensated for by the employment of a current-regulator capable of maintaining a uniform strength of current in the circuit; but should a motor be entirely relieved of its load its speed at once runs up, so that an abnormally high resistance to the passage of the current results. It has been proposed to shunt the current around the motor when, under these circumstances, the motor has acquired a given speed; but to do this by simply closing a shunt of low resistance produces an abrupt fall in the resistance of the circuit, to which the ordinary current-regulators are not capable of instantly responding, so that all the remaining motors in the series are for a time more or less affected. To avoid this, I include in the shunt a rheostat or series of resistance-coils, and combine with the same a device which first closes the shunt and then moves slowly over the terminal plates of the coils, so as to reduce the resistance of the shunt gradually, thus giving the current-regulator time to respond to the change. Any form of mechanism that operates or is brought into operation when the motor acquires a given speed or is developing a given counter electro-motive force or opposition to the passage of the current, may be employed to set the shunting device into action. I prefer, however, to use an electro-magnet in a shunt or derived circuit of high resistance around the motor, as by this arrangement an additional and highly-important advantage is secured—viz., that on the occurrence of any accident by which the circuit through the motor is interrupted the shunting device is brought into operation.

I employ as the means for shunting the motor a device that may be operated by hand to cut the motor out of circuit when its use is to be discontinued, or to bring it into circuit from a state of rest, and I construct or arrange the same in such manner that these operations will be gradual and not sudden. Various devices of this kind have been devised; but for ordinary purposes a contact spring or plate, the movement of which over the plates of the rheostat is opposed by the movement of a piston or plunger in a cylinder containing a suitable fluid, will be sufficient.

I will now refer to the drawings for a more particular description of the invention.

Figure 1 is a diagram of the system above described. Fig. 2 is a view, partly in section and partly in elevation, of the shunting device.

A is a dynamo-electric generator. B B are an arbitrary number of motors joined in series in the circuit C C. Around each motor is an open-shunt or derived circuit, D, including a series of resistance-coils or a rheostat, R, the terminal plates of which are designated by the letter E. In position to move over the plates is a contact, F, to which, by means of gravity or any other directive force, is imparted a tendency to slide over the said plates in a direction to cut the coils connected therewith out of the circuit. In the present instance I have shown the contact F attached to a weight, G, carried on the end of the rod $a$ of piston $p$, working in a vertical cylinder, H. The piston $p$ is held in an elevated position with the spring F above the series of plates by a catch, $b$, extending through into the cylinder from a pivoted lever, K. An adjustable spiral spring, S, keeps the catch under the piston, and a small cam-wheel, L, is placed beside the lever for releasing the piston by hand.

The device which I employ for automatically releasing the piston is an electro-magnet, M, in a shunt-circuit, P, around the motor. This circuit is of such high resistance that but little current flows therein under ordinary circumstances. Should the motor run up to a certain speed, predetermined by well understood adjustments, or should the circuit in the motor be interrupted, the magnet M becomes active, attracts the armature $m$, and releases the piston $p$, which slowly descends and gradually cuts out the resistance-coils. This allows the regulator T, which I have illustrated diagrammatically, to reduce the electro-motive force of the generator and keep the current-strength uniform. The motor is brought into circuit again by raising the piston $p$ and bringing in the resistance R. For this I have placed a handle, $c$, on the weight G, which is lifted by hand; but the upward movement of the piston being also retarded no shock to the system is produced, as the motor is brought gradually into operation.

For the current-regulator I prefer to use a device constructed and operating in substantially the manner described in my Patent No. 278,640. Other forms may, however, be used, and in many respects the precise construction of the parts described may be varied without departure from the invention. As examples of this it is obvious that the shunt D, in lieu of being opened, may be increased in resistance to a degree to accomplish practically the same result, and that the devices for controlling it may be any that operate in a manner substantially the same as those I have described.

What I claim as my invention is—

1. In a system comprising a generator, a current-regulator, and two or more motors in series in the circuit from the generator, the combination, with a motor, of a shunt or derived circuit around the same, a rheostat or resistance included in the shunt, a movable contact for varying the said resistance, and a retarding device—such as a dash-pot—for restraining or impeding the movement of the contact, whereby the variation of resistance is effected gradually.

2. In a system comprising a generator, a current-regulator, and two or more motors in series in the circuit of the generator, the combination, with a motor, of a shunt or derived circuit around the same, a variable resistance in the shunt, a movable retarded contact for varying the resistance, and means, substantially as described, for setting the contact in motion upon a predetermined increase in the opposition to the flow of current through the motor, substantially as set forth.

3. In a system comprising a generator, a current-regulator, and two or more motors in series with the generator, the combination, with each motor, of a retarded shunting-switch, and an electro-magnet in a shunt or derived circuit for operating the shunting-switch, in the manner described.

4. In a system of the kind described, the combination, with a motor, of a shunt-circuit, a rheostat or series of resistance-coils therein, a contact arranged to move automatically in one direction over the series of coils, and a retarding device—such as a dash-pot—connected with the contact in a manner to oppose and retard its movement, as herein specified.

5. In a system of the kind described, the combination, with a motor, of a shunt-circuit, a rheostat or series of resistance-coils therein, an automatically-movable contact for varying the resistance, a retarding device for opposing and retarding the movement of the contact, and a locking device for preventing the movement of the contact, as and for the purpose specified.

In testimony whereof I have hereunto set my hand this 15th day of May, 1884.

EDWARD WESTON.

Witnesses:
JOHN C. YOUNG,
RICHD. W. BLOEMEKE.